United States Patent [19]
Franzen

[11] 4,343,678
[45] Aug. 10, 1982

[54] MULTI-STAGE EVAPORATING APPARATUS WITH INTEGRATED HEAT REGENERATING SYSTEM

[75] Inventor: Paul Franzen, Koblenz, Fed. Rep. of Germany

[73] Assignee: Maschinenfabrik Buckau R. Wolf AG, Grevenbroich, Fed. Rep. of Germany

[21] Appl. No.: 216,604

[22] Filed: Dec. 12, 1980

[30] Foreign Application Priority Data

Dec. 21, 1979 [DE] Fed. Rep. of Germany ....... 2951557

[51] Int. Cl.³ .......................................... B01D 1/26
[52] U.S. Cl. .................... 159/24 A; 62/485; 62/497; 159/17 R; 159/DIG. 16
[58] Field of Search .......... 159/24 R, 24 A, DIG. 16, 159/1 R; 62/485, 497

[56] References Cited

U.S. PATENT DOCUMENTS

| | | | |
|---|---|---|---|
| 1,369,366 | 2/1921 | Thoens | 62/483 |
| 3,203,875 | 8/1965 | Sturtevant | 159/24 A |
| 3,489,654 | 1/1970 | Geiringer | 159/DIG. 16 |
| 3,763,020 | 10/1973 | Drew et al. | 159/DIG. 16 |

*Primary Examiner*—Norman Yudkoff
*Attorney, Agent, or Firm*—Michael J. Striker

[57] ABSTRACT

An apparatus for evaporating with heat regeneration has a plurality of evaporating stages, and an absorber which accommodates a multi-component mixture and is connected with the evaporating stages so that the vapor is admitted into the absorber and absorbed by the mixture with generation of heat which is further utilized for the evaporating process per se or another process.

14 Claims, 1 Drawing Figure

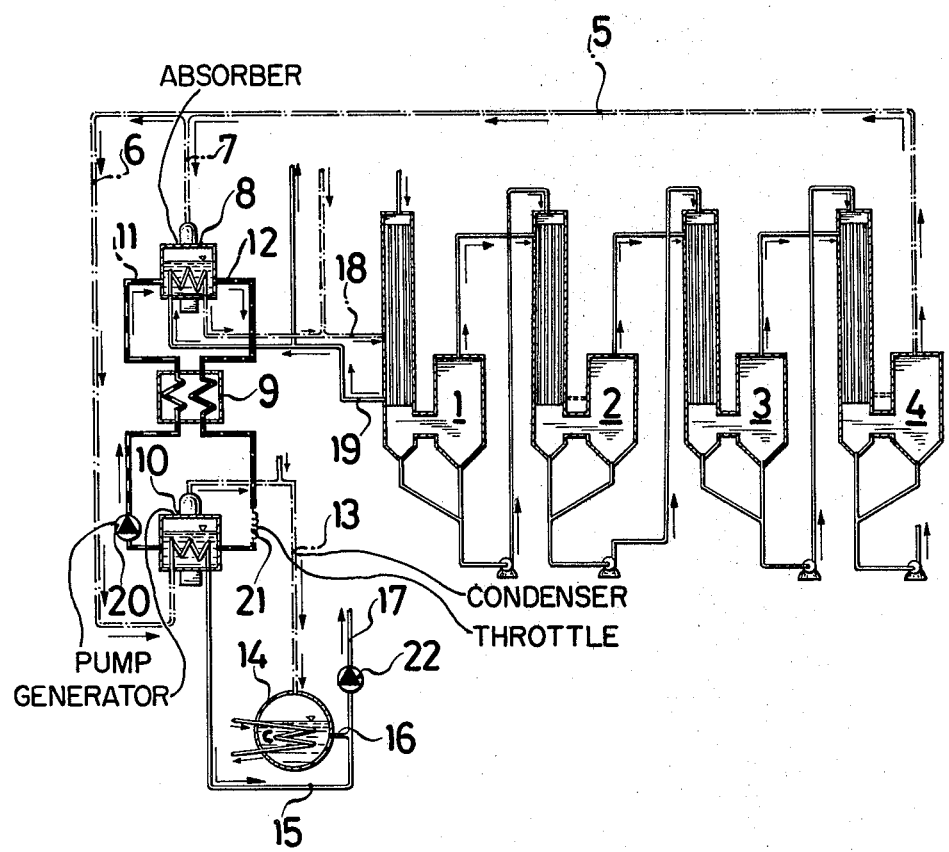

MULTI-STAGE EVAPORATING APPARATUS WITH INTEGRATED HEAT REGENERATING SYSTEM

BACKGROUND OF THE INVENTION

The present invention relates to an evaporating apparatus with heat regenerating system. More particularly, it relates to such an evaporating apparatus in which heat of vapor is at least partially converted into available heat with higher temperature without significant utilization of high energy and thereafter the thus obtained heat is utilized for the evaporating process itself or for another process.

Apparatuses of the above-mentioned general type are known in the art. Such apparatuses are utilized for evaporation processes in thermal equipment for evaporation of solutions or thermal separation of substances. They are utilized for reduction of primary energy consumption during thermal material separation processes by heat recycling with the utilization particularly of latent heat content of the vapor. The vapor of the last evaporation stage of a multi-stage apparatus is liquefied in jet-condensers, and the condensate is carried away into the atmosphere. In dependence upon the temperature of the evaporated solution the vapor in some cases can be partially condensed because it gives out heat to the solution to be preheated. Since, however, the vapor can transfer heat to the solution only for such time until the solution attains approximately the vapor temperature and the latent heat content of the steam is always greater than the heat quantity transferred during this process, the major part of the vapor heat is given away to the atmosphere without being utilized. When the temperature difference between the vapor of the final stage and the hot vapor for the first stage is not too great, and when the characteristics of the vapor allow, vapor compressors for the regeneration of process vapor can be introduced. However, in this condition the compressors require more energy than they can spare during their operation.

SUMMARY OF THE INVENTION

Accordingly, it is an object of the present invention to provide an evaporating apparatus which avoids the disadvantages of the prior art.

More particularly, it is an object of the present invention to provide an evaporating apparatus in which hot vapor is generated with complete utilization particularly of the latent vapor heat, which hot vapor can be utilized for the first or one of the further evaporating stages as process vapor, whereby the primary energy consumption for making available the process vapor is considerably reduced.

In keeping with these objects, and with others which will become apparent hereafter, one feature of the present invention resides, briefly stated, in an evaporating apparatus in which absorbing means accommodating a multi-component mixture is connected with evaporating means so that the vapor from the latter is admitted into the absorbing means and absorbed by the mixture with generation of heat which is supplied to a consumer.

A part of the vapor of the final evaporating stage is supplied into an absorber in which a non-saturated, multi-component mixture is accommodated, so that the vapor is absorbed by the mixture. With suitable selection of the components of the mixture, the absorption of the vapor generates heat with high temperature which is utilized for generation of process vapor. The withdrawal of the absorption heat can be carried out through a heat exchanger in known manner. After the multi-component mixture attains the saturated condition, it is throttled with a low pressure and supplied to an expeller. In the expeller, because of heat supply, vapor contained in the absorber is evaporated in condition of lower temperature from the mixture. Heat required for the evaporation is received from vapor withdrawn from the final evaporation stage without direct supply to the absorber. The vapor which remains in the expeller is condensed by the surrounding atmosphere and mixed with the condensate which is taken for heating of the expeller. Then it can be utilized as boiler heat water or industrial water. When the evaporating apparatus is designed in accordance with the applicant's invention, it provides for the following highly advantageous results. The regenerated heat has such a high temperature that it can be introduced into process itself without insignificant addition of high energy. The primary energy consumption for the vaporization process relative to the quantity of the evaporated solution is considerably reduced as compared with evaporators with the identical number of stages. When the inventive apparatus is compared with the evaporating apparatuses with coupled heat transformers, the apparatus expenditures for the heat regeneration system are considerably smaller with simultaneous decrease of the energy losses, and a greater temperature increase is possible in the same temperature conditions. The consumption of the cooling medium and the thermal environmental load is decreased as compared with conventional evaporating apparatuses with identical output.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a view which schematically shows an evaporating apparatus in accordance with the present invention.

DESCRIPTION OF THE PREFERRED EMBODIMENT

An evaporating apparatus in accordance with the present invention has four evaporators 1-4. It is to be understood that a different number of evaporators or evaporating stages can be utilized in the apparatus. The apparatus further has an absorber 8, a heat exchanger 9, an expeller 10, a condensator 14, and a plurality of conduits communicating respective parts of the apparatus with one another.

The vapor of the evaporating stage 4, for example water vapor, comes out from the evaporating stage 4 via a conduit 5 with a temperature of approximately 70° C. A part of the vapor travels via a conduit 7 into the absorber 8. The absorber 8 accommodates a non-saturated mixture, for example of LiBr and $H_2O$ with a pressure p1 which does not exceed 0.31 $bar_g$. The vapor is absorbed by the mixture, and during the absorption, heat with a temperature of approximately 113° C. is generated. This heat is carried away via a heat exchanger of the absorber and utilized for generation of process vapor. This process vapor is supplied via a conduit 18 together with fresh vapor coming from a vapor container, to a stage 1.

At the entrance of the absorber 8, the saturated mixture is withdrawn via a conduit 12 and throttled below the heat exchanger 9 in a throttle 21 to the pressure p2 not less than 0.023 bar$_g$, prior to its supply into the expeller 10. The expeller 10 is also supplied via a conduit 6 with vapor which is condensed in a heat exchanger of the expeller 10 and gives out heat to the two-component mixture. Thereby water is evaporated for such a long time until the original composition of the mixture is attained. With this process the low concentrated mixture which contains 5% less of $H_2O$ than the higher concentrated mixture, is compressed by a pump 20 to the higher absorber pressure and, after heat exchange with the higher concentrated solution in the heat exchanger 9, is supplied via a conduit 11 to the absorber 8. The expelled water vapor is supplied via a conduit 13 into the condenser 14 wherein it is condensed by heat exchange with the surrounding atmosphere (the cooling water temperature does not exceed 17° C.). The condensate is withdrawn via a conduit 16 and mixed with the condensate from a conduit 15.

In condition when the evaporating temperature is equal to 70° C., the required fresh vapor temperature is equal to 110° C., and the condensation of the expelled vapor is performed at the temperature 20° C., the above-described apparatus can produce from 1 kilogram of vapor approximately 0.52 kg of fresh vapor, wherein it is presupposed that the condensate in the first evaporating stage in the conduit 19 has a temperature of 105° C. The temperature of the condensate in the conduit 17 is approximately equal to 47° C.

It will be understood that each of the elements described above, or two or more together, may also find a useful application in other types of constructions differing from the types described above.

While the invention has been illustrated and described as embodied in an apparatus for evaporating with regeneration of heat, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for evaporating with heat regeneration, comprising evaporating means arranged to produce vapor; absorbing means accommodating a multicomponent mixture and connected with said evaporating means so that the vapor is admitted into said absorbing means and absorbed by said mixture with generation of heat; means for supplying the heat generated in said absorbing means to a consumer; an expeller communicating with said absorbing means so that the mixture, after the absorption of the vapor, is supplied into said expeller, regenerated in the latter by evaporation of the absorbed vapor and supplied back to said absorbing means, said expeller also communicating with said evaporating means so as to utilize condensation heat of the vapor from said evaporating means for regeneration of the mixture in said expeller; and means for liquefying the evaporated vapor from said expeller under the action of low temperature.

2. An apparatus as defined in claim 1, wherein said evaporating means includes at least one evaporating unit; and further comprising means communicating said one evaporating unit with said absorbing means and said expeller, so that the vapor from said one evaporating unit is supplied both to said absorbing means and said expeller.

3. An apparatus as defined in claim 1, wherein said supplying means is means for supplying the heat generated in said absorbing means to said evaporating means.

4. An apparatus as defined in claim 1, wherein said evaporating means includes at least one evaporating unit operating under the action of a process heat, said supplying means being arranged so that the heat generated in said absorbing means is utilized for generation of the process heat.

5. An apparatus as defined in claim 4, wherein said evaporating means includes a plurality of such evaporating units operating under the action of process heat, said supplying means being arranged so that the heat generated in said absorbing means is utilized for generation of the process heat for said plurality of absorbing units.

6. An apparatus as defined in claim 4; and further comprising means for performing an additional process with utilization of heat energy, said supplying means being arranged so that the heat generated in said absorbing means supplies the heat energy for said additional process.

7. An apparatus as defined in claim 1; and further comprising an absorption device operating in accordance with a heat transformer principle, said supplying means being arranged to supply the heat generated in said absorbing means.

8. An apparatus as defined in claim 1; and further comprising means for providing a working medium utilized for further absorption in order to further increase waste heat temperature, said supplying means being arranged to supply the heat generated in said absorbing means for evaporating the working medium.

9. An apparatus as defined in claim 1, wherein said expeller is arranged to continuously regenerate the mixture.

10. An apparatus as defined in claim 1, wherein said expeller is arranged to discontinuously regenerate the mixture.

11. An apparatus as defined in claim 1, wherein said evaporating means includes at least one evaporating unit; and further comprising means for communicating said one evaporating unit with said expeller so as to utilize condensation heat of the vapor from said one evaporating unit for generation of the mixture in said expeller.

12. An apparatus as defined in claim 1; and further comprising means for supplying higher temperature heat into said expeller for regeneration of one part of the vapor containing mixture, and supplying a lower temperature heat for regeneration of a remaining part of the vapor containing mixture.

13. An apparatus as defined in claim 11, wherein process heat generated in said absorber and surrounding atmosphere have predetermined temperatures, said supplying means being arranged so that in said expeller one part of the absorbed vapor which evaporates at the higher temperature is condensed somewhat above the temperature of the process heat in said absorber and thereby also generates process heat, whereas another part of the absorbed vapor which evaporates at the lower temperature is condensed under the action of the surrounding atmosphere.

14. An apparatus as defined in claim 1, wherein said liquefying means is exposed to surrounding atmosphere so as to provide the low temperature.

* * * * *